United States Patent
Park et al.

(10) Patent No.: US 10,640,226 B2
(45) Date of Patent: May 5, 2020

(54) LIQUID STORAGE SYSTEM

(71) Applicant: BAE Systems plc, London (GB)

(72) Inventors: Nicholas Park, South Gloucestershire (GB); Simon Anthony Jenkins, South Gloucestershire (GB)

(73) Assignee: BAE Systems plc, London (GB)

( * ) Notice: Subject to any disclaimer, the term of this patent is extended or adjusted under 35 U.S.C. 154(b) by 431 days.

(21) Appl. No.: 15/307,669

(22) PCT Filed: May 6, 2015

(86) PCT No.: PCT/GB2015/051322
§ 371 (c)(1),
(2) Date: Oct. 28, 2016

(87) PCT Pub. No.: WO2015/170089
PCT Pub. Date: Nov. 12, 2015

(65) Prior Publication Data
US 2017/0043880 A1 Feb. 16, 2017

(30) Foreign Application Priority Data

May 7, 2014 (GB) .................................. 1408013.9
May 7, 2014 (GB) ................................. 14275102.3

(51) Int. Cl.
*B64D 37/32* (2006.01)
*B60K 15/03* (2006.01)
(Continued)

(52) U.S. Cl.
CPC .............. *B64D 37/32* (2013.01); *B60K 15/03* (2013.01); *B64D 37/06* (2013.01); *F41H 5/0492* (2013.01);
(Continued)

(58) Field of Classification Search
CPC .. B64D 37/32; B64D 37/06; B64D 2037/325; B60K 15/03; B60K 2015/03047; F41H 5/0492; B60Y 2200/51
(Continued)

(56) References Cited

U.S. PATENT DOCUMENTS

| 1,874,685 A | 8/1932 | Wright |
| 2,343,005 A | 2/1944 | Gardner |

(Continued)

FOREIGN PATENT DOCUMENTS

| DE | 19749950 A1 | 5/1999 |
| DE | 10218144 A1 | 11/2003 |

(Continued)

OTHER PUBLICATIONS

International Preliminary Report on Patentability of Application No. PCT/GB2015/05132 dated Aug. 9, 2016, 18 pages.
(Continued)

*Primary Examiner* — Chun Hoi Cheung
*Assistant Examiner* — Brijesh V. Patel
(74) *Attorney, Agent, or Firm* — Maine Cernota & Rardin

(57) ABSTRACT

A liquid storage system comprising: a tank for containing a liquid, the tank enclosing a liquid storage space; and a tank liner fixedly attached to an internal surface of the tank (16). The tank liner comprises: a plurality of elements, each element having a hardness value of 2 GPa or above; and a binder material in which the plurality of elements are embedded. The elements have a higher hardness value than the binder material. A distance between a first element and the internal surface of the tank in a direction normal to the internal surface of the tank is different to a distance between a second element and the internal surface of the tank in the direction normal to the internal surface of the tank, the first element being different to the second element.

12 Claims, 2 Drawing Sheets

(51) Int. Cl.
  *B64D 37/06* (2006.01)
  *F41H 5/04* (2006.01)
(52) U.S. Cl.
  CPC . *B60K 2015/03407* (2013.01); *B60Y 2200/51* (2013.01); *B64D 2037/325* (2013.01)
(58) Field of Classification Search
  USPC .... 220/563, 562, 4.15, 4.14, 4.12, 501, 555, 220/553; 137/574, 576, 571; 244/135 B, 244/135 R, 172.3, 172.2
  See application file for complete search history.

(56) References Cited

U.S. PATENT DOCUMENTS

| | | | |
|---|---|---|---|
| 2,354,701 A | 8/1944 | Pescara | |
| 2,519,393 A | 8/1950 | Noyes | |
| 2,754,992 A * | 7/1956 | Wilson | B64D 37/06 220/560.02 |
| 3,004,509 A | 10/1961 | Leroux | |
| 3,420,477 A | 1/1969 | Durrell | |
| 3,616,189 A | 10/1971 | Harr | |
| 3,712,139 A | 1/1973 | Harvey | |
| 3,969,563 A | 7/1976 | Hollis | |
| 4,336,291 A | 6/1982 | Broadhurst | |
| 4,360,124 A | 11/1982 | Knaus | |
| 4,469,295 A | 9/1984 | Schuster | |
| 4,828,206 A | 5/1989 | Bruno | |
| 4,925,057 A | 5/1990 | Childress | |
| 5,195,650 A | 3/1993 | Leidig | |
| 5,451,015 A | 9/1995 | Cronkhite | |
| 5,462,193 A | 10/1995 | Schoo | |
| 5,474,207 A | 12/1995 | Nouhra | |
| 5,647,503 A | 7/1997 | Steele | |
| 5,674,586 A | 10/1997 | Toni | |
| 5,738,925 A | 4/1998 | Chaput | |
| 6,112,635 A * | 9/2000 | Cohen | F41H 5/0414 428/911 |
| 6,220,287 B1 | 4/2001 | Wolf | |
| 7,833,627 B1 * | 11/2010 | Ferrando | F41H 5/0442 428/416 |
| 7,861,884 B2 | 1/2011 | Childress | |
| 7,934,619 B1 | 5/2011 | Robertson | |
| 7,980,165 B2 * | 7/2011 | Misencik | E04H 9/10 89/36.02 |
| 8,096,223 B1 | 1/2012 | Andrews | |
| 9,266,619 B2 | 2/2016 | Childress | |
| 2002/0047015 A1 | 4/2002 | Distelhoff | |
| 2005/0085146 A1 * | 4/2005 | Farkas | B32B 5/24 442/134 |
| 2006/0174417 A1 | 8/2006 | Elrod | |
| 2007/0017359 A1 | 1/2007 | Gamache | |
| 2008/0148929 A1 | 6/2008 | Graphenius | |
| 2009/0090236 A1 | 4/2009 | Misencik | |
| 2009/0152278 A1 | 6/2009 | Lindner | |
| 2009/0236163 A1 | 9/2009 | Wibbeke et al. | |
| 2010/0185384 A1 | 7/2010 | Naito | |
| 2011/0017748 A1 | 1/2011 | Palma | |
| 2011/0094598 A1 | 4/2011 | Childress et al. | |
| 2011/0168728 A1 | 7/2011 | McDermott | |
| 2012/0055937 A1 | 3/2012 | Monk | |
| 2012/0181288 A1 | 7/2012 | Childress | |
| 2012/0266745 A1 * | 10/2012 | Warren | F41H 5/0414 89/36.02 |
| 2012/0312150 A1 * | 12/2012 | Gamache | F41H 5/0492 89/36.02 |
| 2013/0064139 A1 | 3/2013 | Kolavennu | |
| 2013/0082062 A1 | 4/2013 | Kawamoto et al. | |
| 2013/0228067 A1 * | 9/2013 | McElfresh | F41H 5/0457 89/36.02 |
| 2015/0102040 A1 | 4/2015 | Bornes | |

FOREIGN PATENT DOCUMENTS

| | | |
|---|---|---|
| DE | 202013103931 U | 9/2013 |
| EP | 0056289 A1 | 7/1982 |
| EP | 124205 A1 | 7/1984 |
| EP | 0299503 A2 | 1/1989 |
| EP | 0689991 B1 | 2/1999 |
| EP | 1147934 A1 | 10/2001 |
| EP | 2048079 A2 | 4/2009 |
| FR | 493293 A | 8/1919 |
| FR | 2101483 A5 | 3/1972 |
| FR | 2264566 A1 | 10/1975 |
| FR | 3011822 A1 | 4/2015 |
| GB | 191217292 A | 11/1912 |
| GB | 367579 A | 2/1932 |
| GB | 565121 A | 10/1944 |
| GB | 0567936 A | 3/1945 |
| GB | 584741 A | 1/1947 |
| GB | 585517 A | 2/1947 |
| GB | 685440 A | 1/1953 |
| GB | 1234675 A | 5/1971 |
| GB | 1510860 A | 5/1978 |
| GB | 2054456 A | 2/1981 |
| GB | 2054457 A | 2/1981 |
| GB | 2088806 A | 6/1982 |
| GB | 2124887 A | 2/1984 |
| GB | 2155873 A | 10/1985 |
| GB | 2198099 A | 6/1988 |
| GB | 2275455 A | 8/1994 |
| JP | 2007237776 A | 9/2007 |
| WO | 1996039335 A1 | 12/1996 |
| WO | 0034121 A1 | 6/2000 |
| WO | 2006015456 A1 | 2/2006 |
| WO | 2012101439 A1 | 8/2012 |
| WO | 2012173594 A1 | 12/2012 |

OTHER PUBLICATIONS

Characteristics of Kyocera Technical Ceramics, Jun. 30, 2004, XP055149244, Retrieved Oct. 28, 2014 from url: http://americas.kyocera.com/kicc/pdf/kyocera_Material_Characteristics.pdf.
Great Britain Combination Exam and Search Report of Application No. GB1507725.8, dated Nov. 3, 2015, 6 pages.
Great Britain Search Report of Application No. GB1408013.9, dated Nov. 19, 2014, 4 pages.
Extended European Search Report of Application No. EP14275102, dated Oct. 28, 2014, 9 pages.
International Search Report and Written Opinion of Applciation No. PCT/GB2015/051322, dated Jul. 2, 2015, 14 pages.
Extended European Search Report of Application No. EP14275103, dated Nov. 5, 2014, 9 pages.
Great Britain Search Report of Application GB1408015.4, dated Oct. 29, 2014, 3 pages.
Great Britain Combined Search and Exam Report of Application No. GB1507727.4, dated Oct. 29, 2015, 7 pages.
International Preliminary Report on Patentability of Application No. PCT/GB2015/051324, dated Apr. 8, 2016, 16 pages.
International Search Report and Written Opinion of Application No. PCT/GB2015/051324, dated Jul. 6, 2015, 12 pages.
International Preliminary Report on Patentability PCT/GB2015/051327, dated Apr. 21, 2016, 18 pages.
Great Britain Search Report for application 1408020.4 dated Oct. 30, 2014, 3 pages.
Great Britain Search and Examination Report of application 1507732.4 dated Oct. 22, 2015, 8 pages.
European Search Report for application 14275107.2 dated Nov. 10, 2014, 10 pages.
International Search Report for application PCT/GB2015/051327 dated Jul. 2, 2015, 10 pages.
European Search Report for application 14275104.9 dated Nov. 5, 2014, 9 pages.
Great Britain Search Report for application 1408016.2 dated Oct. 29, 2014, 3 pages.
Great Britain Search and Examination Report of application 1507724.1 dated Oct. 27, 2015, 7 pages.

(56) References Cited

OTHER PUBLICATIONS

International Preliminary Report on Patentability for application PCT/GB2015/051321 dated Apr. 25, 2016, 18 pages.
International Search Report for application PCT/GB2015/051321 dated Jul. 7, 2015, 12 pages.
European Search Report for application 14275105.6 dated Nov. 2, 2014, 8 pages.
Great Britain Search Report for application 1408018.8 dated Oct. 30, 2014, 3 pages.
Great Britain Search and Examination Report for application 1507731.6 dated Oct. 29, 2015, 6 pages.
International Search Report for application PCT/GB2015/051325 dated Jul. 6, 2015, 11 pages.
International Preliminary Report on Patentability for application No. PCT/GB2015/051325, dated Nov. 8, 2016, 8 pages.

\* cited by examiner

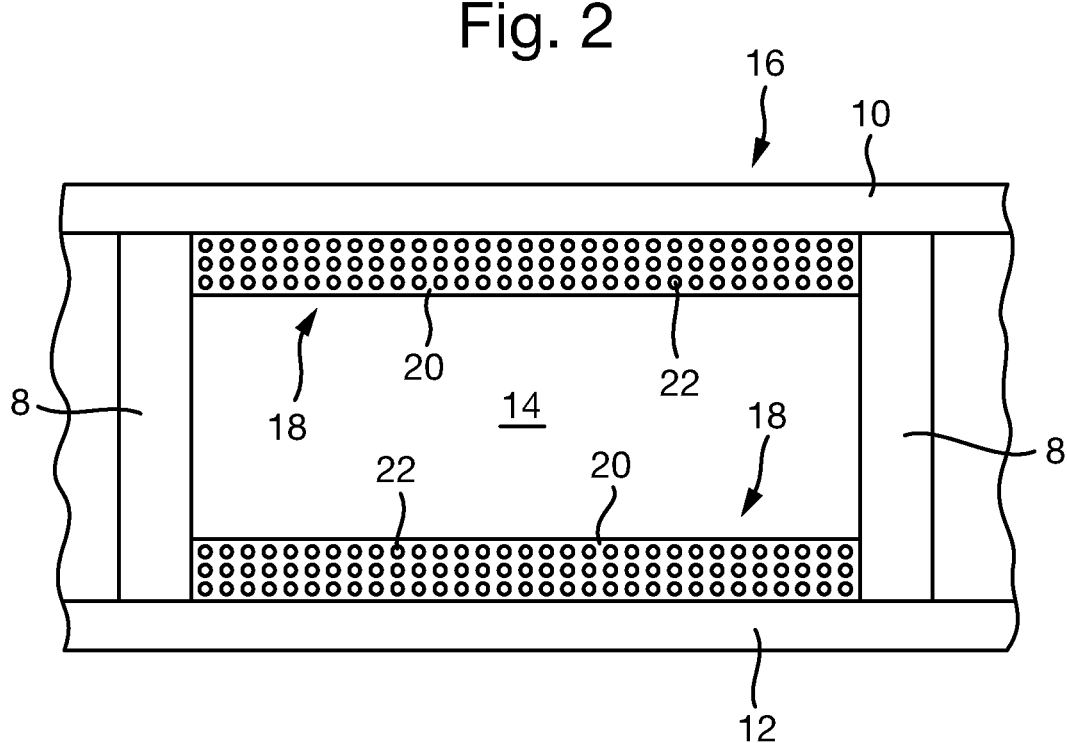
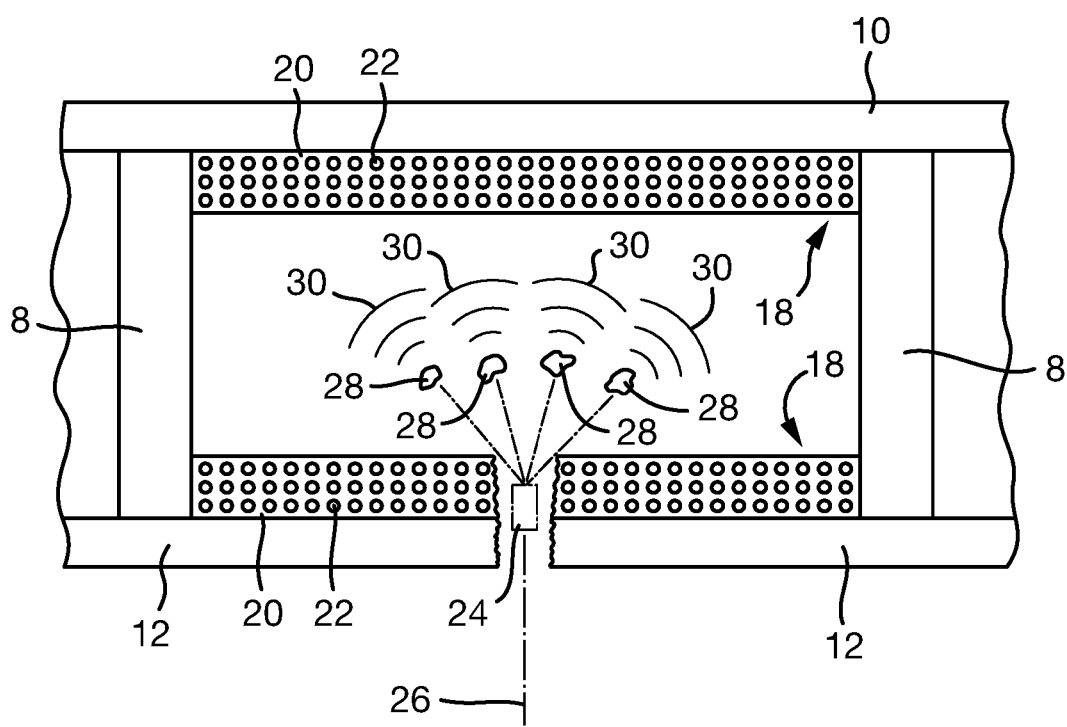

LIQUID STORAGE SYSTEM

RELATED APPLICATIONS

This application is a National Phase Application filed under 35 USC § 371 of PCT Application No. PCT/GB2015/051322 with an International filing date of May 6, 2015, which claims priority of GB Patent Application GB1408013.9 filed May 7, 2014 and EP Patent Application EP14275102.3 filed May 7, 2014. Each of these applications is herein incorporated by reference in its entirety for all purposes.

FIELD OF THE INVENTION

The present invention relates to liquid storage systems.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a liquid storage system comprising: a tank for containing a liquid, said tank enclosing a liquid storage space; and a tank liner fixedly attached to an internal surface of the tank. The tank liner comprises: a plurality of elements, each element having a hardness value of 2 GPa or above; and a binder material in which the plurality of elements are embedded. The elements have a higher hardness value than the binder material. A distance between a first element and the internal surface of the tank in a direction normal to the internal surface of the tank is different to a distance between a second element and the internal surface of the tank in the direction normal to the internal surface of the tank, the first element being different to the second element. Thus, the hard elements are distributed within the binder matrix at different depths of the tank liner. A distance between a first element and the internal surface of the tank may be different to a distance between a second element and the internal surface of the tank, i.e. multiple different elements may have different respective depths with the tank liner. The depth of the tank liner may be a dimension that points from a proximal surface of the liner to a distal surface of the liner.

The elements may be substantially uniformly distributed throughout the binder material. The elements may be distributed throughout the entire bulk of the binder material, i.e. throughout the entirety of the binder material.

The binder material may be more flexible than walls of the tank, for example, such that loads carried in use by the binder material are very small (preferably zero, or insignificant) compared to loads carried by the structure of the tank.

The fuel tank liner may comprises a proximal surface fixedly attached to an internal surface of the tank, and a distal surface opposite to the proximal surface. The elements may be arranged as multiple layers of elements between the proximal surface and the distal surface. A distance between the proximal surface and the distal surface (i.e. a thickness of the tank liner) may be between 10 mm and 25 mm. The tank liner may have a uniform thickness.

A diameter of each of the elements may be in the range 2 mm to 6 mm. Each element may have a hardness value of 20 GPa or above. The elements may be made of ceramic, metal, or a metal alloy. The elements may be substantially spherical in shape. The binder material may be a rubber or a polymer. The tank may be an aircraft fuel tank.

In a further aspect, the present invention provides a vehicle comprising a liquid storage system in accordance with any of the above aspects.

In a further aspect, the present invention provides a method of producing a liquid storage system. The method comprises: providing a tank for containing a liquid, said tank enclosing a liquid storage space; providing, in a liquid or semiliquid form, a binder material; adding a plurality of elements to the liquid or semiliquid binder material, each element having a hardness value of 2 GPa or above; solidifying the binder material so as to embed the plurality of elements in the binder material; and fixedly attaching, to an internal surface of the tank, the solidified binder material with the elements embedded therein, thereby proving a tank liner for the tank. The tank liner is such that a distance between a first element and the internal surface of the tank in a direction normal to the internal surface of the tank is different to a distance between a second element and the internal surface of the tank in the direction normal to the internal surface of the tank, the first element being different to the second element.

The method may further comprise: applying the mixture of the liquid or semiliquid binder material and the plurality of elements to the internal surface of the tank (while the binder material is in its liquid or semiliquid form); and, thereafter, solidifying the mixture of the liquid or semiliquid binder material and the plurality of elements that has been applied to the internal surface of the tank, thereby bonding the binder material with the elements embedded therein to the internal surface of the tank.

The method may further comprise: providing a mould, the mould having a shape complementary to the internal surface of the tank; applying the mixture of the liquid or semiliquid binder material and the plurality of elements to the mould (while the binder material is in its liquid or semiliquid form); thereafter, solidifying the mixture of the liquid or semiliquid binder material and the plurality of elements that has been applied to the mould; and fixedly attaching, to the internal surface of the tank, the solidified binder material with the elements embedded therein.

In a further aspect, the present invention provides at least part of a wall of a tank for containing a fluid, the at least part of the wall comprising a plurality of elements, each element having a hardness value of 2 GPa or above, and a binder material in which the plurality of elements are embedded. The elements have a higher hardness value than the binder material.

Each element may have a hardness value of 5 GPa or above. Each element may have a hardness value of 10 GPa or above. Each element may have a hardness value of 15 GPa or above. Each element may have a hardness value of 20 GPa or above.

The elements may be arranged in the binder material such that, when the at least part of the wall of the tank is impacted by a projectile having sufficient kinetic energy for at least part of the projectile to fully penetrate the at least part of the wall, the projectile impacts with at least one of the elements.

The elements may be made of ceramic, metal, or a metal alloy.

The elements may be substantially spherical in shape.

A diameter of each of the elements may be in the range 2 mm to 6 mm

The binder material may be a rubber or a polymer. For example, the binder material may be a polymer matrix in which is also embedded a fibre-based such as carbon fibres. Thus, the at least part of a wall may be a carbon fibre composite (CFC) panel (e.g. an outer skin of an aircraft), in which is embedded the relatively hard elements.

The at least part of a wall of a tank may be a liner for a tank which is configured to be applied to an internal surface of a tank.

In a further aspect, the present invention provides a tank for containing a liquid, wherein at least part of a wall of the tank is in accordance with the preceding aspect.

The at least part of the tank wall may be a liner for the tank which is applied to an internal surface of the tank. The total cavity volume of the tank liner in the tank may be less than or equal to 15% by volume of the tank volume.

The tank may be an aircraft fuel tank.

In a further aspect, the present invention provides a vehicle (e.g. an aircraft) comprising a tank for containing a liquid in accordance with the preceding aspect.

BRIEF DESCRIPTION OF THE DRAWINGS

FIG. 2 is a schematic illustration (not to scale) showing a cross section through a fuel tank located in the aircraft wing; and FIG. 3 is a schematic illustration (not to scale) illustrating effects of a projectile impacting with an external surface of the fuel tank.

DETAILED DESCRIPTION

Figure 1:
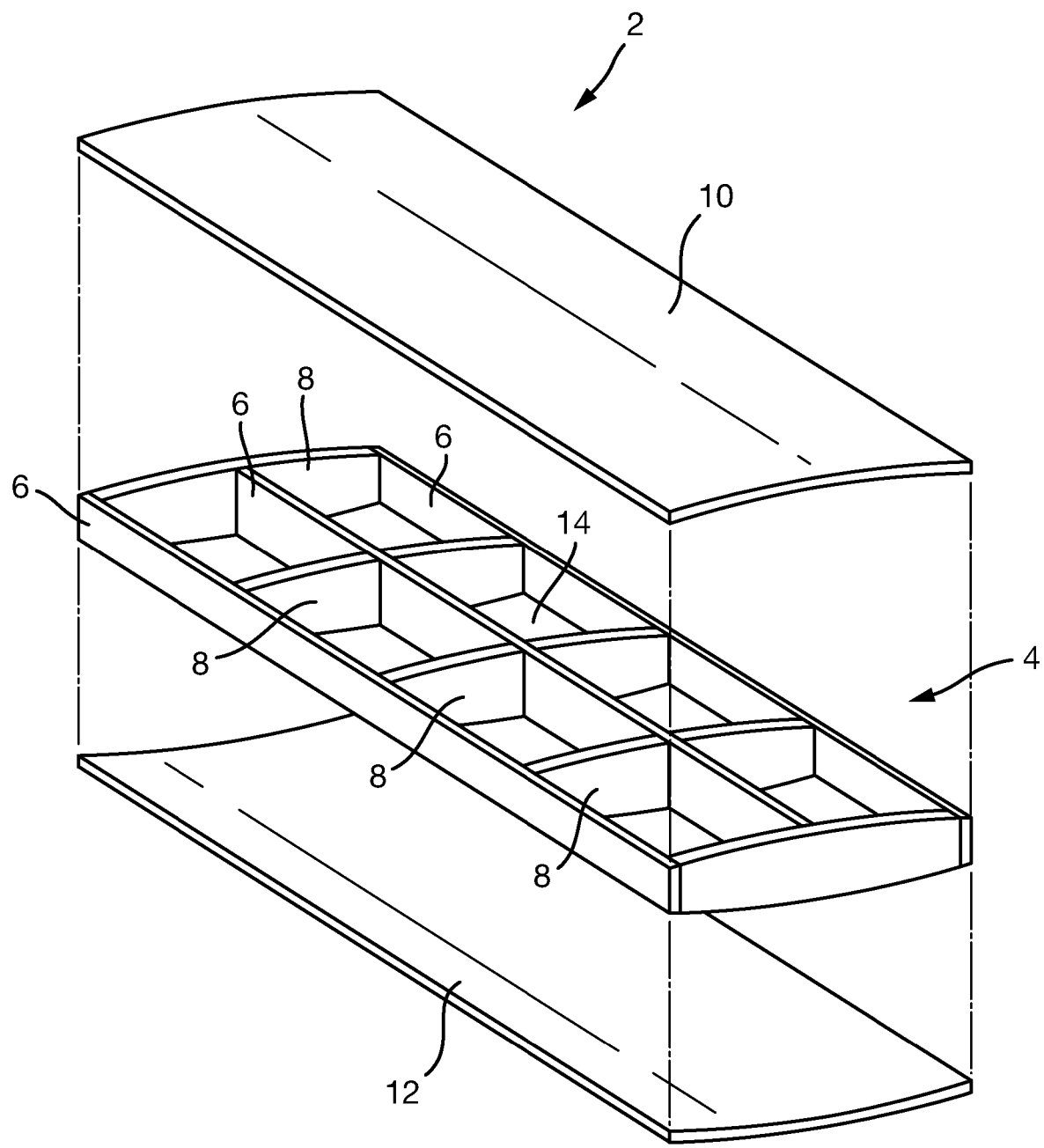
FIG. 1 is a schematic illustration (not to scale) of an exploded view of an example aircraft wing in which an embodiment of a fuel tank liner is implemented.

In the following description, like reference numerals refer to like elements.

The following description is based on embodiments of the invention and should not be taken as limiting the invention with regard to alternative embodiments that are not explicitly described herein. Structural material types and methods of construction identified are examples only.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an exploded view of an example aircraft wing 2 in which an embodiment of a fuel tank liner is implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

FIG. 2 is a schematic illustration (not to scale) showing a cross section through the fuel tank 16 in the aircraft wing 2.

In this embodiment, the outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises two fuel tank liners 18. A first of the fuel tank liners 18 is disposed on an internal surface of the upper skin 10, i.e. the surface of the upper skin 10 that is inside the fuel tank 16. A second of the fuel tank liners 18 is disposed on an internal surface of the lower skin 12, i.e. the surface of the lower skin 12 that is inside the fuel tank 16.

Preferably, the fuel tank liners 18 cover the entirety of the internal surfaces of the external skins 10, 12 that define the fuel tank 16. Further, the fuel tank liners 18 may also cover the surfaces of the ribs 8 or spars 6.

In this embodiment, each fuel tank liner 18 is a layer of composite material that comprises a binder matrix 20 in which is embedded a plurality of objects 22.

The binder matrix 20 may be any appropriate material that may be used to bind together or retain the objects 22. For example, the binder material 20 may be rubber or a polymer.

Preferably, the binder matrix 20 is relatively flexible compared to the structure of the aircraft wing 2 to which it is to be attached. In other words, preferably, the binder matrix 20 is more flexible that the external skins 10, 12, the spars 6, and the ribs 8. The binder matrix 20 being more flexible than the aircraft structure advantageously tends to provide that, when the tank liner 18 is fixed into the fuel tank 16, the fuel tank liner 18 tends not to carry any load, or only an insignificant load, compared to the structure of the aircraft (i.e. compared to the spars 6, the ribs 8, and/or the external skins 10, 12). Thus, the tank liner 18 tends not to change, to any significant extent, the loading distribution of the aircraft wing 2. Thus, the design of the wing 2, and the structural design process performed in designing the aircraft wing 2, tend not to be undermined or invalidated by the application of the tank liner 18 to the wing 2. Thus, application of the tank liner 18 to a wing 2 (e.g. retrofitting to an existing wing) tends to be facilitated.

In some embodiments, the objects 22 may be included (i.e. embedded) directly within the composite layup of the tank structure, for example, within the skins 10, 12.

In this embodiment, the objects 22 are substantially spherical in shape, each having a diameter of approximately 2 mm to 6 mm. However, in other embodiments, one or more of the objects 22 may have a different shape and/or size, for example, an object 22 may be rod-shaped (i.e. elongate) or a cube (e.g. a rounded cube). In some embodiments, the objects 22 are larger than 6 mm in diameter, for example the objects 22 may have diameters between 6 mm and 22 mm. In this embodiment, the objects 22 are harder and/or denser than the binder matrix 20. In this embodiment, the objects 22 are harder and/or denser than the CFC material that forms the external skins 10, 12. In this embodiment, the objects 22 are made of ceramic, e.g. zirconia, silicon nitride, alumina, or silicon carbide. Preferably the objects 22 have a hardness value (e.g. a Vickers hardness or a Knoop hardness) of 2 GPa or above. More preferably the objects 22 have a hardness value (e.g. a Vickers hardness or a Knoop hardness) of 5 GPa or above. More preferably the objects 22 have a hardness value (e.g. a Vickers hardness or a Knoop hardness) of 10 GPa or above, for example the objects 22 may be made of Zirconias and Aluminium Nitrides having a Knoop hardness in the range of 10 GPa to 14 GPa. More preferably the objects 22 have a hardness value (e.g. a Vickers hardness or a Knoop hardness) of 15 GPa or above, for example the objects 22 may be made of Aluminas and Silicon Nitrides which typically have a Vickers hardness of 15 GPa to 20 GPa. More preferably the objects 22 have a hardness value (e.g. a Vickers hardness or a Knoop hardness) of 20 GPa or above, for example the objects 22 may be made of a carbide having a Knoop hardness of over 20 GPa, e.g. Silicon Carbides and Boron Carbides which typically have a Vickers hardness of about 20 GPa to 30 GPa.

In this embodiment, the concentration and arrangement of the objects 22 within the fuel tank liners 18 are such that a projectile passing through the thickness of a fuel tank liner 18 will tend to impact with at least one of the objects 22, and preferably multiple objects 22. In some embodiments, the objects 22 are arranged in the binder matrix 20 in layers e.g. between 3 and 5 layers. More preferably there are more than 5 layers of objects 22. The objects 22 within a fuel tank liner 18 may be more closely packed together closer to the external skin 10, 12 to which that fuel tank liner 18 is attached.

In this embodiment, the objects 22 are distributed substantially uniformly within a fuel tank liner 18. In other words, the objects 22 are evenly spread throughout the fuel tank liners 18. This advantageously tends to increase the likelihood of a projectile that impacts with and penetrates a fuel tank liner 18 impacting with at least one of the objects 22.

In this embodiment, a distance between an object 22 and the internal surface of the tank 16 in a direction normal to the internal surface of the tank 16 is different to a distance between at least one other object 22 and the internal surface of the tank 16 in the direction normal to the internal surface of the tank 16. In other words, multiple different objects 22 each have different respective depths in the fuel tank liner 18. The depth of a fuel tank liner 18 is understood to be the dimension of that fuel tank liner 18 along a direction that points from a proximal surface of the tank liner 18 (i.e., a surface of the tank liner 18 that is attached to the internal surface of the fuel tank 16), and a distal surface of the tank liner 18 (i.e. the surface opposite to the proximal surface), for example, in a direction normal to the proximal and/or distal surfaces. This may be due at least in part to the uniform distribution of the objects 22, and the sizes of the objects 22 relative to the thickness of a fuel tank liner 18. Thus, in effect, objects 22 may be arranged in multiple layers within a fuel tank liner 18. This advantageously tends to increase the likelihood of a projectile that impacts with and penetrates a fuel tank liner 18 impacting with multiple objects 22 as it passes through the liner 18.

Each fuel tank liner 18 may have any appropriate depth (i.e. thickness), for example, 10 mm to 20 mm, or 15 mm to 19 mm. Preferably, the thicknesses of the fuel tank liners 18 are such that the fuel tank liners 18 occupy less than or equal to 15% (e.g. approximately 10%) of the fuel tank capacity. In other embodiments, the fuel tank liners 18 are a different thickness that provides that the fuel tank liners 18 occupy a different proportion of the fuel tank capacity. Preferably, the fuel tank liners 18 are of uniform thickness.

The fuel tank liners 18 may be attached to the externals skins 10, 12 by any appropriate means for example using an adhesive or by performing a bonding process.

In some embodiments, a fuel tank liner 18 is formed and attached to an internal surface of the fuel tank as follows. Firstly, the binder material 20 is provided in a liquid (e.g. molten) or semiliquid state. Secondly, the objects 22 are added to, and thoroughly mixed with, the liquid binder material 20. The mixing of the objects 22 into the liquid binder material 20 tends to substantially uniformly distribute the objects 22 within the binder material 20. Thirdly, the liquid binder material 20 with the object 22 therein is spread across a surface of the aircraft component to which the fuel tank liner 18 is to line. For example, the mixture of the binder material 20 and the objects 22 may be poured over a surface of an aircraft panel 10, 12 that is to form an internal surface of the fuel tank 16. The mixture of the binder material 20 and the objects 22 may be applied to an aircraft component before, during, or after assembly of the aircraft wing 2. Lastly, the mixture of the binder material 20 and the objects 22 is solidified, for example, the liquid binder material 20 may be allowed to harden (e.g. by cooling), or may be cured. This solidification of the mixture of the binder material 20 and the objects 22 tends to bond the binder material 20 to the aircraft component to which the mixture has been applied. Thus, a solid fuel tank liner 18 is formed on an aircraft component. In some embodiments, a cast or mould may be used to shape the fuel tank liner 18 on the aircraft component. This cast or mould may be removed after solidification of the mixture of the binder material 20 and the objects 22.

In some embodiments, a fuel tank liner 18 is formed and attached to an internal surface of the fuel tank as follows. Firstly, the binder material 20 is provided in a liquid (e.g. molten) or semiliquid state. Secondly, the objects 22 are added to, and thoroughly mixed with, the liquid binder material 20. The mixing of the objects 22 into the liquid binder material 20 tends to substantially uniformly distribute the objects 22 within the binder material 20. Thirdly, the liquid binder material 20 with the object 22 therein is applied to a mould tool or cast in a desired shape (i.e. a shape that conforms to the shape of the surface to which the fuel tank liner 18 is to be applied). The mixture of the binder material 20 and the objects 22 is then solidified, for example, by cooling or curing. Thus, a solid fuel tank liner 18 is formed. The fuel tank liner may be removed from the cast or mould after solidification. The solidified fuel tank liner 18 may be attached to an internal surface of the fuel tank 16, for example, using a layer of adhesive.

As will now be described in more detail, the fuel tank liners 18 are operable to reduce hydrodynamic ram pressure in the fuel contained within the fuel tank 16 resulting from impact of a projectile with an external surface of the fuel tank 16.

FIG. 3 is a schematic illustration (not to scale) illustrating effects of a projectile 24 impacting with the lower skin 12 of the fuel tank 16. The path of the projectile through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

After passing through the lower skin 12, the projectile 24 impacts with the fuel tank liner 18 disposed on the lower skin 12.

The projectile 24 impacting with one or more of the objects 22 in the fuel tank liner 18 tends to retard the passage of the projectile 24 into the fuel tank 16. Impact kinetic energy of the projectile 24 tends to be absorbed at least to some extent by the fuel tank liner 18 and also transferred to the objects 22 which may be ejected into the fluid volume.

Also, projectile 24 impacting with one or more of the objects 22 in the fuel tank liner 18 may cause the projectile 24 to break up, or fragment, or be eroded into smaller parts prior to it entering the cavity 14. To facilitate this, preferably the objects 22 are harder and/or denser than the projectile 24. In some embodiments, the size of the objects 22, the hardness size of the objects 22, the density size of the objects 22, the concentration size of the objects 22 within the binder matrix 20, and or any other attribute of the objects 22 and/or binder matrix 20 may be determined (e.g. by experimentation or modelling) so as to maximise the likelihood of fragmentation of the projectile 24. The impact of the projectile 24 with objects 22 in the fuel tank liner 18 may also cause fragmentation of a portion of the fuel tank liner 18 disposed on the lower skin 12. The fragments into which the projectile 24 is broken up, and the fragments of the fuel tank liner 18, are hereinafter collectively referred to as "fragments" and are indicated in FIG. 3 by the reference numerals 28. Thus, impact energy of the projectile 24 is absorbed at least to some extent by the fuel tank liner 18 disposed on the lower skin in the fragmentation of the projectile and/or the fuel tank liner 18.

Impact with one or more of the objects 22 may cause the projectile 24 to have increased tumble when travelling through the fluid.

In this example, on impact of the fragments 28 with the fuel, the fragments tend to generate respective high pressure shock waves 30. Each of these shock waves 30 tend to be of significantly lower energy than a shock wave or shock waves that would have been generated if the projectile 24 had not fragmented. Thus, pressures resulting from the shock waves 30 exerted on the walls of the fuel tank 16 tend to be lower than the shock wave pressures that would have been exerted on the walls of the fuel tank 16 if the projectile 24 had not fragmented. Thus, the likelihood of damage to the walls of the fuels tank 16 (e.g. decoupling of the external skin 10, 12 from the spars 6 or ribs 8 tends to be reduced.

In this example, as a fragment 28 passes through the fuel, a cavitation "wake" may form behind that fragment 28, i.e. a region of low pressure (e.g. a vapour or a vacuum) may form in the wake of a fragment 28. This causes a fluid displacement and an increase in the pressure of the fluid in the fuel tank 16. The increased fuel pressure resulting from cavitation caused by the fragments 28 tends to be significantly lower than the pressure increase that would have been caused by cavitation if the projectile 24 had not fragmented. Thus, pressures resulting from cavitation exerted on the walls of the fuel tank 16 when the projectile 24 is fragmented tend to be lower than the pressures that would have been exerted on the walls of the fuel tank 16 if the projectile 24 had not been fragmented. Thus, the likelihood of damage to the walls of the fuels tank 16 (e.g. decoupling of the external skin 10, 12 from the spars 6 or ribs 8 tends to be reduced.

In this example, when travelling through the fuel, the fragments 28 tend to experience a greater overall drag force compared to that that would be experienced by the projectile 24 if the projectile 24 had not fragmented. This tends to be at least in part due to the increased surface area of the fragments 28 compared to the non-fragmented projectile 24. Thus, the passage of the projectile/fragments through the fluid in the fuel tank 16 tends to be retarded. The retardation of the passage of the projectile/fragments through the fluid tends to decrease the likelihood of the projectile/fragments impacting with the upper skin 10. Thus, the likelihood of a hole being formed in the upper skin tends to be reduced. Furthermore, the increase in drag on the projectile/fragments tends to mean that a greater portion of the impact energy is absorbed by the fluid in the fuel tank 16. Thus, forces exerted on the walls of the fuel tank 16 tend to be reduced.

Additionally, in this example, the fuel tank liner 18 disposed on the upper skin 10 is located within the fuel tank 16 such that the shock waves 30 resulting from compression of the fuel in the fuel tank 16 resulting from impact of the projectile 24 with the lower skin 12 impinge on the fuel tank liner 18 disposed on the upper skin 10 and so that the shock waves 30 interact with the fuel tank liner 18 disposed on the upper skin 10 before impinging on the upper skin 10. The fuel tank liner 18 disposed on the upper skin 10 tends to reflect incident shock waves 30 at least to some extent. Also, the fuel tank liner 18 disposed on the upper skin 10 tends to be a relatively poor transmitter of impinging shock waves 30. Thus, the amplitude of the shock waves 30 impinging upon the upper skin 10 tends to be reduced and consequently the pressure experienced by the upper skin 10 tends to be diminished by the presence of the fuel tank liner 18 disposed on the upper skin 10. The fuel tank liners 18 advantageously tend to decouple the fuel from walls of the fuel tank 16.

Furthermore, were any of the fragments 28 (or even the non-fragmented projectile 24) to continue through the cavity 14 and impact with the fuel tank liner 18 disposed on the upper skin 10, the fuel tank liner 18 disposed on the upper skin 10 would tend to cause further break-up or fragmentation of the impinging fragment 28 (or the non-fragmented projectile 24), thereby further reducing impact energy and reducing force experienced by at least the upper skin 10.

An advantage provided by the above described fuel tank liner is that hydrodynamic ram damage to a fuel tank caused by an object impacting with an external surface of the fuel tank tends to be reduced or eliminated. Hydrodynamic pressures and their associated structural responses tend to be reduced or eliminated. Thus, the likelihood of catastrophic failure of the fuel tank and corresponding aircraft loss tends to be reduced or eliminated.

The above described fuel tank liner advantageously tends to be relative easy and cheap to manufacture.

The above described fuel tank liner tends to be relatively easy to retrofit to existing aircraft fuel tanks.

The above described fuel tank liner tends to provide protection against hydrodynamic ram damage whilst occupying a relatively small amount of the fuel tank's capacity.

In the above embodiments, the fuel tank liners are used to line the surfaces of an aircraft wing fuel tank. However, in other embodiments, the fuel tank liners are a different type of liner and may be used to line an internal or external surface of a different type of container for containing fluid. In some embodiments, one or more walls of the container may be made of a different material to that described above.

In the above embodiments, fuel tank liners are disposed on the internal surfaces of the upper and lower aircraft skins. However, in other embodiments a fuel tank liner may be disposed on a different surface of the fuel tank instead of or in addition one or both of the internal surfaces of the upper and lower aircraft skins. For example, in some embodiments, all internal surfaces of the fuel tank are covered by fuel tank liners. In some embodiments, a fuel tank liner is only disposed on a single surface of the fuel tank, for example, on only the internal surfaces of the lower aircraft skin.

In the above embodiments, the fuel tank liners include objects embedded in the binder material. These objects are substantially spherical in shape, are made of ceramic, and have a diameter of 4 mm to 5 mm. However, in other embodiments, one or more of the objects may be a different shape, e.g. an irregular shape. In other embodiments, one or more of the objects may be made of a different appropriate material, e.g. metal or alloy such as hardened steel, for example the objects may be made of stainless steel which typically has a Vickers hardness of about 5 GPa or cemented carbide which typically has a Vickers hardness of above 15 GPa. Also, in other embodiments one or more of the objects may have a different size, for example, in some embodiments, some or all of the objects are larger than 5 mm in diameter. Similarly, in other embodiments, some or all of the objects are smaller than 4 mm in diameter.

Preferably, the objects have diameters between 3 mm and 5 mm.

In the above embodiments, the liner material is a layer of material which may be applied to an internal surface of the fuel tank. However, in other embodiments, the fuel tank liner may be integral to one or more of the walls of the fuel tank. For example, in some embodiment, the objects may be directly embedded in one or more of the walls of the fuel tank. For example, in some embodiment, the objects are embedded in the portion of the lower skin that forms a wall of the fuel tank, i.e. the objects are directly embedded in the CFC material that forms the lower skin.

What is claimed is:

1. An aircraft fuel storage system comprising:
    an aircraft fuel tank for containing aircraft fuel, said aircraft fuel tank enclosing a liquid storage space; and
    a tank liner fixedly attached to an internal surface of the aircraft fuel tank, wherein the tank liner comprises:
    a plurality of spherical elements, each spherical element having a hardness value of 2 GPa or above; and
    a binder material in which the plurality of spherical elements are embedded,
    wherein the plurality of spherical elements have a higher hardness value than the binder material,
    wherein the tank liner comprises a proximal surface fixedly attached to the internal surface of the aircraft fuel tank and a distal surface spaced apart therefrom opposite to the proximal surface,
    wherein a space between opposing distal surfaces of the tank liner defines an enclosed, fuel-storing portion of the aircraft fuel tank,
    wherein at least portions of the binder material are exposed directly to the liquid storage space, and
    wherein the plurality of spherical elements are arranged as multiple layers of spherical elements between the proximal surface and the distal surfaces of the tank liner.

2. The aircraft fuel storage system according to claim 1, wherein the plurality of spherical elements are uniformly distributed throughout the binder material.

3. The aircraft fuel storage system according to claim 1, wherein the tank liner is more flexible than walls of the aircraft fuel tank.

4. The aircraft fuel storage system according to claim 1, wherein a distance between the proximal surface and the distal surface of the tank liner is between 10 mm and 25 mm.

5. The aircraft fuel storage system according to claim 1, wherein a diameter of each of the plurality of spherical elements is in the range of 2 mm to 6 mm.

6. The aircraft fuel storage system according to claim 1, wherein each of the plurality of spherical element has a hardness value of 20 GPa or above.

7. The aircraft fuel storage system according to claim 1, wherein the plurality of spherical elements are made of ceramic, metal, or a metal alloy.

8. The aircraft fuel storage system according to claim 1, wherein the binder material is a rubber or a polymer.

9. An aircraft comprising the aircraft fuel storage system of claim 1.

10. A method of producing an aircraft fuel storage system, the method comprising:
    providing an aircraft fuel tank for containing aircraft fuel, said aircraft fuel tank enclosing a liquid storage space; and
    providing, in a liquid or semi-liquid form, a binder material;
    adding a plurality of spherical elements to the liquid or semi-liquid binder material, each of the plurality of spherical elements having a hardness value of 2 GPa or above;
    solidifying the binder material so as to embed the plurality of spherical elements in the binder material; and
    fixedly attaching, to an internal surface of the aircraft fuel tank, the solidified binder material with the plurality of spherical elements embedded therein, thereby proving a tank liner for the aircraft fuel tank, the tank liner being such that the tank liner comprises a proximal surface fixedly attached to the internal surface of the aircraft fuel tank, and a distal surface opposite to the proximal surface, and the plurality of spherical elements are arranged as multiple layers of spherical elements between the proximal surface and the distal surface.

11. The method according to claim 10, wherein the method further comprises:
    applying the mixture of the liquid or semi-liquid binder material and the plurality of spherical elements to the internal surface of the aircraft fuel tank; and
    solidifying the mixture of the liquid or semi-liquid binder material and the plurality of spherical elements that has been applied to the internal surface of the aircraft fuel tank, thereby bonding the binder material with the plurality of spherical elements embedded therein to the internal surface of the aircraft fuel tank.

12. The method according to claim 10, wherein the method further comprises:
   providing a mold, the mold having a shape complementary to the internal surface of the aircraft fuel tank;
   applying the mixture of the liquid or semi-liquid binder material and the plurality of spherical elements to the mold;
   solidifying the mixture of the liquid or semi-liquid binder material and the plurality of spherical elements that has been applied to the mold; and
   thereafter, fixedly attaching, to the internal surface of the aircraft fuel tank, the solidified binder material with the spherical elements embedded therein.

* * * * *